Jan. 9, 1968 K. V. HUDSON ET AL 3,363,174
INSULATING SUPPORT FOR HIGH VOLTAGE LINE CONDUCTOR, INCLUDING
LINE COUPLING MEANS
Filed July 18, 1963 2 Sheets-Sheet 1
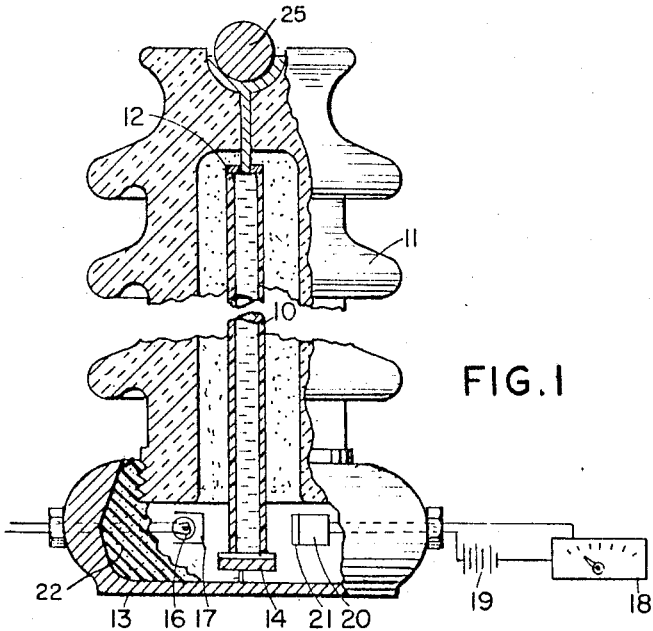
FIG. 1
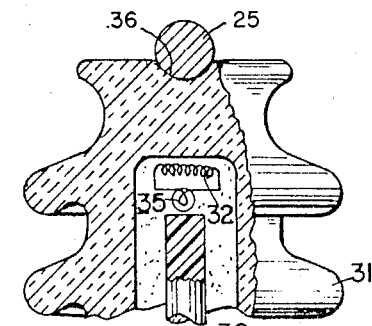
FIG. 2
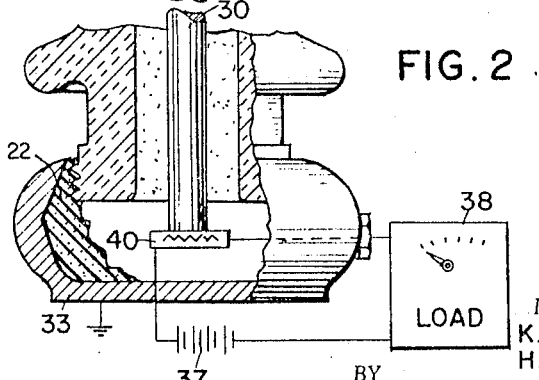
INVENTOR.
K.V. Hudson
H.T. Adkins
BY Moses, Mc.Glew & Toren
ATTORNEYS.

Jan. 9, 1968  K. V. HUDSON ET AL  3,363,174
INSULATING SUPPORT FOR HIGH VOLTAGE LINE CONDUCTOR, INCLUDING
LINE COUPLING MEANS
Filed July 18, 1963  2 Sheets-Sheet 2
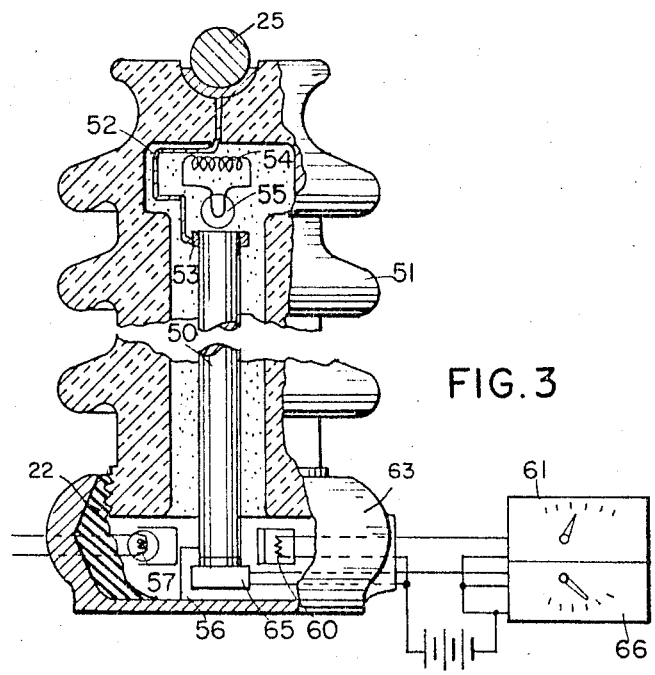
FIG. 3
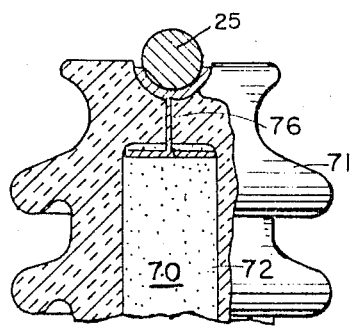
FIG. 4
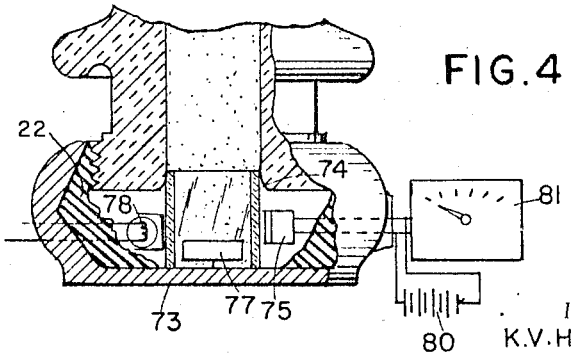
INVENTOR.
K.V. Hudson
H.T. Adkins
BY Moses, McGlew & Toren
ATTORNEYS.

3,363,174
INSULATING SUPPORT FOR HIGH VOLTAGE LINE CONDUCTOR, INCLUDING LINE COUPLING MEANS
Katharine Virginia Hudson, Chestnut Hill, and Harold T. Adkins, Marshfield, Mass., assignors to Sigma Instruments Inc., Braintree, Mass.
Filed July 18, 1963, Ser. No. 296,038
5 Claims. (Cl. 324—96)

This invention relates to devices for use in determining an electrical property, such as the current voltage, of a test line such as, for example, of an electric transmission line or the like. More particularly, the invention is directed to a novel coupling device for obtaining a voltage or current from a high voltage power line conductor, and serving as a permanent insulating support for the conductor.

The invention may be used for producing visual or other indications of changing conditions or for the control or correction of such conditions.

The current and voltage of heavy duty power lines and the like is determined usually by the use of current and voltage transformers. These may be permanently installed, as in power plants, sub-stations and the like or may be portable for use on outside transmission and distribution lines. Due to capacitative and voltage stress effects, it is difficult to provide an insulated current or voltage coupling device wherein the device must not only be at ground potential but must also be close to the high voltage conductor. For safety reasons with respect to operating personnel, it is desirable that such a coupling device be thoroughly insulated from the high voltage. However, it has not been practical to provide such a coupling device which is thoroughly isolated from the high voltage and yet will provide an adequate and accurate reading of or response to the current or voltage.

An object of the present invention, therefore, is to provide a novel coupling device for obtaining a voltage or current from a power line conductor, and which may be used safely with high voltage lines.

Another object of the invention is to provide such a coupling device operating upon a novel principle providing for adequate isolation from high voltage without any loss in the accuracy of the readings or responses obtained.

A further object of the invention is to provide such a coupling device which is usable safely with high voltage transmission and distribution lines, and utilizing photoelectric principles to provide accurate readings.

In accordance with these and other objects of the invention, the coupling devices of the present invention serve as permanent insulating supports for a high voltage power line conductor, and include a high voltage hollow tubular insulator having one open end and one closed end, with a single cavity defined along the length of the interior thereof. The closed end of the insulator has an external formation for receiving and supporting a current conductor on the insulator, and enabling the insulator to be located in predetermined angular orientation with respect to the longitudinal direction of the supported conductor. The principal feature of the invention is the provision of a relatively elongated rod or other element of dielectric material extending along and within the insulator cavity and having a pick-up or detector at its outer end and a photoelectric sensing means at its inner end. The inner end of the rod or other element is preferably grounded.

In one embodiment of coupling devices incorporating the invention, advantage is taken of electro-optics or magneto-optics, such as the Pockles, Kerr, or Faraday effects. The light transmission of a plastic, solid, liquid, or thin film element is varied by the electrostatic or electromagnetic field impressed thereon due to voltage or current. The general effect of such fields is to polarize or double refract light in such a manner that the effects are proportional to the electrostatic or electromagnetic stresses.

In accordance with this principle, either a solid rod or a tube filled with liquid is provided and is relatively elongated so that its base or inner end is thoroughly isolated from a high voltage line. The electrostatic or electromagnetic effects upon the rod, and particularly adjacent its operative or "live" end, change the light transmission properties of the rod or tube. By placing a relatively constant value light source adjacent the base or inner end of the rod or tube, which end is usually grounded, and by placing a photocell in such a position that the light from the light source passes through the rod or tube, the variation in the light properties of the rod or tube, due to the electromagnetic or electrostatic fields, may be measured.

In another embodiment of the invention, a coupling device is provided in which a current transformer is located at an operative or active outer end of a relatively elongated rod or tube of light transmitting dielectric material. This current transformer is used to energize a suitable light source, with the light source having a light output value corresponding to the current through the line. At the opposite inner or base end of the light transmitting rod or tube, a photocell, such as a current sensor photocell, is placed and is thus thoroughly isolated from the high voltage of the line. The light passing through the tube, which varies in accordance with the current flow through the line, thus varies the output of the photocell and this output may be measured by a suitably calibrated meter.

To provide a universal instrument by means of which an indication of kva. may be obtained, the voltage coupling device and the current coupling device can be combined, with the voltage coupling device measuring the variation in the light transmission properties of the rod or tube of dielectric material, as effected by the electromagnetic and electrostatic fields, and the current coupling device measuring the variation in light transmitted through the tube from the light source connected to a current transformer.

For an understanding of the principles of the invention, reference is made to the following description of typical embodiments thereof as illustrated in the accompanying drawings.

In the drawings:

FIG. 1 is a somewhat schematic longitudinal sectional view through a voltage coupling device embodying the invention;

FIG. 2 is a similar view through a current coupling device embodying the invention;

FIG. 3 is a similar view through a combined current and voltage coupling device unit embodying the invention; and FIG. 4 is a similar view of another modification of the invention.

Referring to FIG. 1, a high voltage coupling device is illustrated as comprising a relatively elongated light transmitting dielectric tube 10 which may alternatively be a dielectric tube filled with light transmitting liquid or a solid rod of light transmitting dielectric material. Tube 10 is preferably enclosed in and extends through a high voltage hollow tubular insulator 11, having one open end and one closed end and a single cavity defined along its length. The upper closed end of insulator 11 has an external formation for receiving and supporting a current conductor 25 in predetermined angular orientation relative to the insulator. Adjacent its upper or operative end, the dielectric tube 10 is illustrated as having an electrically conductive probe 12 projecting therefrom to at least the surface of the insulator 11 to engage a "live" line or conductor 25 supported by insulator 11, and probe 12 may constitute one electrode of a capacitor.

Adjacent its opposite end, the combination of the tube 10 and the insulator 11 is provided with a housing or casing 13 secured to insulator 11 by a suitable cement or other compound 22, and this opposite end of the assembly is illustrated as including a grounded electrically conductive member 14, constituting the other electrode of the capacitor. By virtue of the relatively elongated tube 10, which is of dielectric material, and by virtue of the relatively elongated insulator 11, the operative end of the unit, comprising the probe 12, is thoroughly isolated from the grounded end 14 of the tube 10. Thus, when the outer end 12 is near a transmission line conductor, distribution line conductor, or a bus bar, supported by insulator 11 and carrying a high voltage, the grounded end 14 is thoroughly isolated from such conductor or bus bar.

As previously stated, the light transmission characteristics of the tube 10 or of the liquid within the tube are varied in accordance with the electrostatic or electromagnetic field of the conductor under test. In general, the electromagnetic effect is used to measure current through a conductor. However, the voltage of the conductor can be converted to a magnetic effect by the use of a suitable coil, and such a coil may be associated with the probe 12, as described below in connection with FIG. 2.

To take advantage of the variation in the light transmission properties of the rod or tube 10, a schematically illustrated substantially constant light source is indicated at 16 as positioned adjacent one side of the tube or rod 10 adjacent the grounded electrode 14. Any suitable light source may be used, such as an incandescent light source, a luminous gas light source, a neon tube, a corona tube, or any other type of light source. In spatial opposition to the light source 16, there is placed a photocell 20, so that the light falling upon the photocell 20 is a function of the light transmission properties of the rod or tube 10. Either the light source 16 may be polarized, as indicated at 17, or the photocell 20 may be polarized, as indicated at 21, or both may be polarized. Thus, advantage may be taken of the polarization of the light passing through the rod or tube 10 as effected by the voltage and resulting electrostatic and electromagnetic fields around the conductor under test.

The photocell 20 has its output connected, through a battery 19, to a current meter 18 which is preferably calibrated in volts. Thereby, the variation in light transmission properties of the tube or rod 10, due to the electromagnetic and electrostatic fields as applied through the probe 12, may be measured by the photocell 20 whose resistance will be varied in accordance with the variation in the voltage. Thus, the voltage of the conductor under test can be read directly by the meter 18.

FIG. 2 schematically illustrates a current coupling device embodying the invention. This current coupling device comprises a light transmitting dielectric rod or tube 30 which again is relatively elongated and is embedded or enclosed within a relatively elongated high voltage insulator 31 having a construction and function substantially identical to those of insulator 11. Adjacent the upper or operative end of the rod 30, there is positioned a current pick-up 32 which may be in the form of a coil having its axis transverse to the axis of the conductor and to formation 36 and which acts as a current transformer. A suitable light source, which may be either a filamentary light bulb, an electroluminescent source, a neon tube, a corona tube, or other current-to-light converting device indicated at 35, is connected across the terminals of the coil 32. The opposite end of the pick-up may be, and preferably is, grounded as indicated at 33. This end is thoroughly isolated from the high voltage conductor 25 by means of the dielectric light transmitting rod or tube 30 and the insulator 31.

A photocell 40 is placed in operative light receiving relation adjacent this end of rod or tube 30, and is connected in series with a battery 37 and a meter 38 which latter may be calibrated in amperes or which may be a recording type of meter, or otherwise calibrated in load values or the like. Thus, the current in the conductor 25 under test affects the light output of the current-to-light converter 35. Accordingly, the light transmitted through the rod or tube 30 is varied in correspondence with variations in the current flow in the conductor under test, and thereby the resistance of the photocell 40 will be correspondingly varied. This provides a reading on the meter 38 of the current in the line under test.

FIG. 3 shows a combined current and voltage coupling device which may be used to determine the kva. of the test line. Referring to FIG. 3, a dielectric rod or a dielectric liquid-filled tube 50 is relatively elongated and is embedded or enclosed within a relatively elongated high voltage insulator 51 substantially identical, in construction and function, to insulator 11. A schematically illustrated probe 52 is connected to the upper or operative end of the tube 50 in a suitable manner, as by means of a metal ring 53. A current transformer 54, such as that shown in FIG. 2, is connected in energizing relation with a light source or light converter 55 mounted above the upper end of the liquid filled tube or rod 50. Probe 52, preferably extends at least to the surface of the insulator 51.

The tube or rod 50 is made of suitable light transmitting material capable of having its properties changed in response to changes in the voltage in the conductor. To measure the voltage in the line under test, a suitable light source 57 is mounted adjacent the lower end of the rod or tube 50, this end being suitably grounded to housing or casing 63 as indicated at 56. In operative relation with the light 57, there is provided a photocell or phototube 60 so that the light from the source 57 is effective upon the photocell or phototube 60 and the light effective upon the photocell varies in accordance with variations in the light transmitting properties of the rod or tube 50. The photocell 60 is connected to a suitable metering device 61, which is schematically illustrated and may be the type of metering arrangement shown in FIG. 1.

Furthermore, another photocell 65 is connected adjacent the lower end of the tube 50 so as to measure the light transmitted therethrough by the light source 55, in the same manner as described in connection with FIG. 2. The photocell 65 may be connected to a suitable metering device 66 so that the current in the conductor under test may thus be directly indicated.

The photocell 65 is subjected to variations in the amount of light from the source 55 which may or may not be modified by the changes in light transmittal properties of the tube or rod 50 produced by changes in voltage. This will depend on the character of change produced in the particular material used in the tube or rod. Proper calibration of the metering device 66 will enable a correct indication to be obtained.

The arrangement of FIG. 3 is useful in determining the kva. of the test line, and this may be determined readily by a simple computation using the indications of meters 61 and 66.

FIG. 4 illustrates a coupling device of the type of FIG. 1, but in which a column of dielectric liquid 70 replaces the dielectric tube. In the arrangement of FIG. 4, an insulator 71, substantially identical in construction and function to indicator 11, is formed with an axial bore or cavity 72, and a casing or housing 73 is secured to the lower end of insulator 71. A tube 74 of glass or other transparent material extends from bore 72 to the base of casing 73.

Bore 72 and the tube 74 are filled with a dielectric liquid 70 having essentially the same properties as tube or rod 10 of FIG. 1. A probe 76 extends between bore or cavity 72 and the upper end surface of insulator 71, and is electrically conductive to constitute one electrode of a capacitor. The other electrode is constituted by a grounded electrically conductive plate 77 disposed in tube 74. A substantially constant light source 78 is positioned adjacent tube 74 and diametrically opposite a photocell 75 connected, in series, with a battery 80, to a metering device 81. The arrangement operates in the same manner as the pick-up of FIG. 1.

Among typical dielectric liquids 70, whose light transmission properties are varied in accordance with the electrostatic or electromagnetic field impressed thereon, are acetone, benzene, chloroform, carbon disulphide, water, chlorobenzene, nitrotoluene, and nitrobenzene. A preferred liquid 70 for use in the present invention is nitrobenzene. Typical solids having such characteristics, and usable in the embodiment of FIG. 1, are polystyrene, acrylic resins, epoxy resins, polyesters and Mylar resins, of which polystyrene presently is preferred.

It will be noted that, in each of the embodiments of the invention, the lower, inner or base end of the device is thoroughly isolated from the high voltage source adjacent the operative outer or conductor supporting end thereof by means of the relatively elongated tube or rod of dielectric material within the cavity the relatively elongated hollow tubular high voltage insulator 51 or 71. Hence, even if the inner or base end of the device is grounded, it is nevertheless effectively isolated from the high voltage source. Nevertheless, the accuracy of the readings is not affected by such isolation, due to the provision of the photoelectric converting means for providing the readings of voltage or current or both. A typical value of voltage gradient along the solid or liquid dielectric is 1000 volts/mm. However, this value can vary with the specific material, or even due to such considerations as overload capability, by a factor of ten or twenty to one.

While specific embodiments of the invention have been shown and described in detail to illustrate the application of the principles of the invention, it will be understood that the invention may be embodied otherwise without departing from such principles.

What is claimed is:

1. A coupling device for obtaining an electrical property from a high voltage power line conductor, and serving as a permanent insulating support for the conductor, comprising, in combination, a high voltage hollow tubular insulator having one open end and one closed end with a single cavity defined along the length of the interior thereof, said closed end having an external formation for receiving and supporting said current conductor on said insulator, and enabling said insulator to be located in predetermined angular orientation with respect to the longitudinal direction of said conductor; a relatively elongated element of light transmitting dielectric material extending along said cavity and having an operative outer end and an inner end electrically isolated from each other; probing means at said operative outer end operable to convert variations in an electrical property of a high voltage conductor, supported on said formation into variations in a field effective upon said element, said variations in said field affecting the light transmission properties of said element; a light source positioned adjacent the inner end of said element; photoelectric means positioned adjacent said inner end of said element in operative relation to receive light from said light source as transmitted through said inner end of said element; and electric metering means in operative circuit connection with said photoelectric means; the light effective upon said photoelectric means being variable as a function of the variations in the light transmitting properties of said element as effected by said field.

2. A coupling device as claimed in claim 1, in which said elongated element is a rod.

3. A coupling device as claimed in claim 1, in which said elongated element is a tube filled with liquid.

4. A coupling device as claimed in claim 1, in which said relatively elongated element is a column of liquid in the cavity of said insulator.

5. A coupling device for obtaining an electrical property from a high voltage power line conductor, and serving as a permanent insulating support for the conductor, comprising, in combination, a high voltage hollow tubular insulator having one open end and one closed end with a single cavity defined along the length of the interior thereof, said closed end having an external formation for receiving and supporting said current conductor on said insulator, and enabling said insulator to be located in predetermined angular orientation with respect to the longitudinal direction of said conductors; a relatively elongated element of light transmitting dielectric material extending along said cavity and having an operative outer end and an inner end electrically isolated from each other; probing means at said operative outer end operable to convert variations in an electrical property of a high voltage conductor, supported on said formation into a field impressed upon said element and effective to vary the light transmission properties of said element in accordance with variations in the voltage of said conductor; a current transformer at said operative outer end; a first light source at said operative outer end connected across said current transformer and operable to direct light through said element towards said inner end; a second light source mounted adjacent the inner end of said element, first photoelectric means at said inner end having a characteristic variable in accordance with variations in light transmitted through said inner end from said second light source; first electric metering means in operative circuit connection with said first photoelectric means to measure the voltage of said conductor; second photoelectric means at said inner end having a characteristic variable in accordance with variations in light transmitted through said element from said first light source; and second electric metering means in operative circuit connection with said second photoelectric means and indicating the current in said conductor.

References Cited

UNITED STATES PATENTS

| | | | |
|---|---|---|---|
| 850,258 | 4/1907 | Schmidt | 324—127 X |
| 2,078,771 | 4/1937 | Myers | 88—61 |
| 2,081,839 | 5/1937 | Rankin | 324—96 |
| 2,302,874 | 11/1942 | Lion | 324—96 |
| 2,468,125 | 4/1949 | Silver | 324—126 X |
| 3,030,852 | 4/1962 | Pratt. | |

FOREIGN PATENTS 1,042,780  11/1953  France.

OTHER REFERENCES

Ritchey, N. B.: "Self-Contained U.H.F. Wattmeter," pp. 10, 11, 22 and 23 of Engineering Dept. publication, Advanced Dev. Labs, Sylvania Elec. Prod. Inc., December 1944 (copy in 324—96).

RUDOLPH V. ROLINEC, *Primary Examiner.*